United States Patent [19]

Morishita et al.

[11] 4,127,877
[45] Nov. 28, 1978

[54] TWO-DIMENSIONAL CHARGE-COUPLED DEVICE FOR HIGH-RESOLUTION IMAGE PICKUP AND THE LIKE

[75] Inventors: Masanobu Morishita; Yasuo Ishihara, both of Tokyo, Japan

[73] Assignee: Nippon Electric Co., Ltd., Tokyo, Japan

[21] Appl. No.: 618,416

[22] Filed: Oct. 1, 1975

[30] Foreign Application Priority Data

Oct. 2, 1974 [JP] Japan ................................ 49-113412

[51] Int. Cl.$^2$ ........................ H04N 3/14; H04N 5/14
[52] U.S. Cl. .................................... 358/213; 358/162
[58] Field of Search ................ 178/7.1 R; 357/24, 30; 340/17 B, 17 R, 17 C; 307/221 C, 221 D; 358/162, 105, 41, 213, 21

[56] References Cited

U.S. PATENT DOCUMENTS

| | | | |
|---|---|---|---|
| 3,562,424 | 2/1971 | Legler | 358/162 |
| 3,746,883 | 7/1973 | Kovac | 357/24 X |
| 3,931,463 | 1/1976 | Levine | 178/7.1 |
| 3,932,775 | 1/1976 | Kosonocky | 357/24 X |
| 4,012,587 | 3/1977 | Ochi et al. | 358/213 |

OTHER PUBLICATIONS

Use of Charge-Coupled Devices for Delaying Analog Signals: Tompsett and Zimany, Jr., IEEE Journal of Solid State Circuits, Apr., 1973, pp. 151-157.
Solid State Devices 1973, Conference Series Number 19, The Institute of Physics London and Bristol, pp. 83-107.
A New Self-Scanned Photodiode Array, Dyck and Weckler, Solid State Technology, Jul., 1971, pp. 37-42.
Radio-Electronics, Aug., 1973, pp. 56-57.

Primary Examiner—Robert L. Griffin
Assistant Examiner—Aristotelis M. Psitos
Attorney, Agent, or Firm—Hopgood, Calimafde, Kalil, Blaustein & Lieberman

[57] ABSTRACT

A two-dimensional charge-coupled device for relatively high resolution image pick up includes an imaging area, a storage area, and plural output registers for developing plural video signals delayed by predetermined intervals, e.g., integral multiples of one horizontal line trace period. The several register output signals are combined to provide a composite video signal characterized by a greater resolution vis-a-vis the direct CCD output.

1 Claim, 9 Drawing Figures

TWO-DIMENSIONAL CHARGE-COUPLED DEVICE FOR HIGH-RESOLUTION IMAGE PICKUP AND THE LIKE

This invention relates to a two-dimensional charge-coupled device and, particularly, to a device of such type capable of high-resolution image pickup and the like.

A conventional two-dimensional charge-coupled device (CCD) for image pickup comprises an imaging area, a storage area and a read-out register, as shown in an article titled "Interlacing in Charge-Coupled Imaging Devices" published in the IEEE TRANSACTIONS ON ELECTRON DEVICES, Vol. ED-20, No. 6, June 1973, pp 535–541. However, due to the precision limit imposed by the presently available manufacturing technique, the number of parallel array electrodes defining the charge-coupled elements and thus defining the picture elements cannot be made sufficiently large. Because of this difficulty, particularly in increasing the number of the charge-coupled electrodes for horizontal scanning, image pickup tends to be of low resolution.

It is therefore an object of this invention to provide a charge-coupled device for providing high-resolution image pickup and the like without resorting to finer charge-coupled elements, which require thinner electrodes or finer electrode pitch.

According to one feature of this invention, there is provided a two-dimensional charge-coupled imaging device which comprises an imaging area, a storage area, and a read-out register area. The imaging and storage areas include two-dimensionally arranged charge-coupled elements. The read-out register area comprises a plurality of charge-coupled element arrays each having one-dimensionally arranged elements, the arrays having the horizontal storage elements being equal in number to the imaging and storage areas.

Further, according to another feature of this invention, there is provided a high-resolution image pickup system in which a video signal having successive video signal segments, each having a length of one horizontal scanning period (hereinafter, referred to "1H") mutually spaced by a 1H-long non-video signal portion, is obtained from an imaging means, and in which the video signal is delayed by 1H and 2H to obtain a 1H-delayed video signal and a 2H-delayed video signal, respectively. The non-delayed, and 1H and 2H-delayed video signals are added to produce a continuous video signal representing of high-resolution image. The present invention is based on the line correlation technique, whereby the resolution in vertical direction is practically doubled and significantly improved.

The above and other objects, features and advantages of this invention will be better understood from the following detailed description of preferred embodiments of this invention taken in conjunction with the accompanying drawings, wherein.

Figure 1:
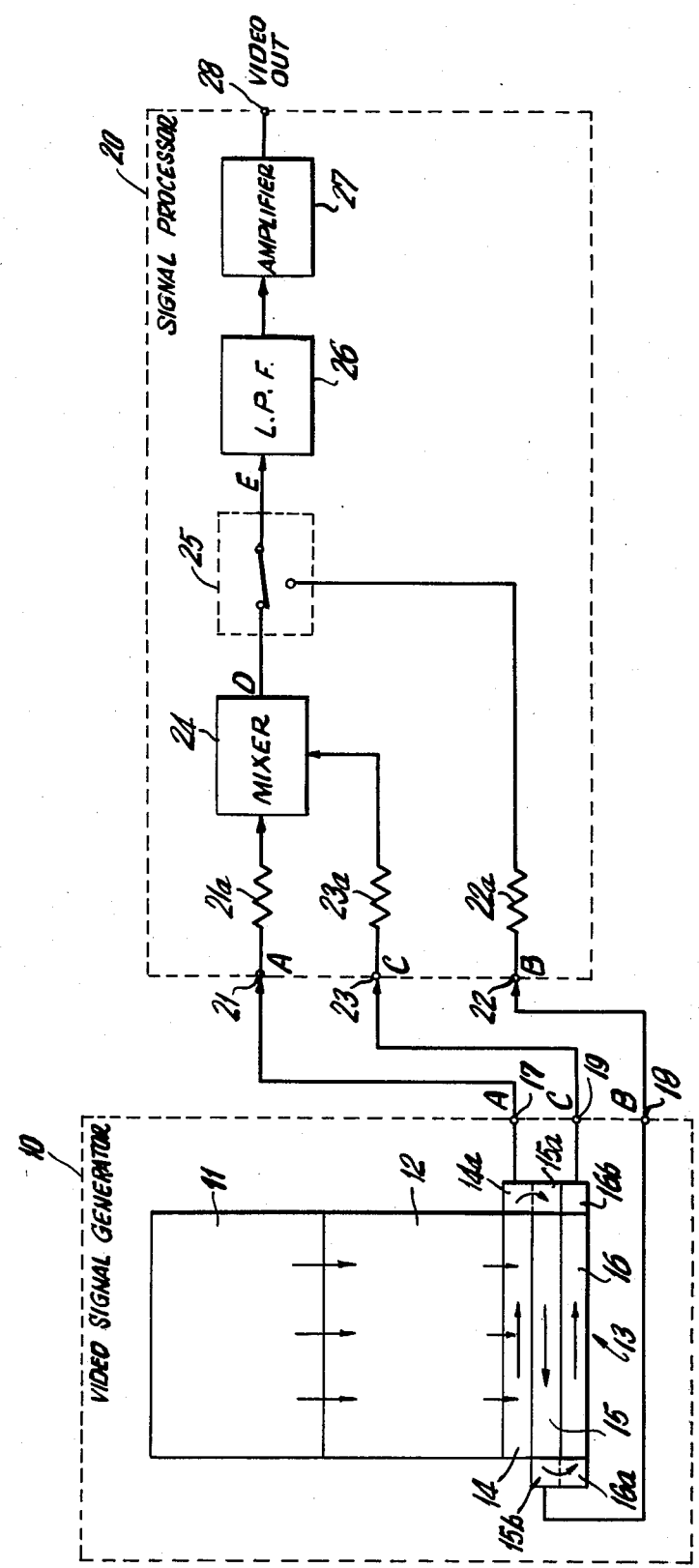
FIG. 1 is a block diagram of a first embodiment of this invention.

Referring to FIG. 1, a first embodiment of this invention comprises a video signal generator 10 made of a two-dimensional charge-coupled device of 256 × 256 elements, and a signal processor 20. The generator 10 generates an interlaced intermittent video signal A alternately having a 1H-long video signal segment $P_1$ and a 1H-long non-video signal portion $P_2$ shown in FIG. 2(1), a 1H delayed video signal B shown in FIG. 2(2), and a 2H delayed video signal C shown in FIG. 2(3). Upon receipt of the video signals A, B and C from the generator 10 the processor 20 produces, a continuous video signal E shown in FIG. 2(5) having a higher resolution (vis-a-vis the signals A, B or C).

The video signal generator 10 comprises an imaging area 11 composed of two-dimensionally arranged charge-coupled elements of 128 × 256 elements, a storage area 12 composed of 128 × 256 two-dimensionally arranged elements, and a read-out register area 13 including three read-out registors 14, 15 and 16 each made of linear charge transfer elements for serially-transferring charges parallel-transferred from the storage area 12. The generator 10 may be of any one of various types of charge coupled devices, for example, a three-phase CCD. Various examples for producing the interlaced video signal from the three-phase CCD in which each unit cell has three electrodes, are described in the above-mentioned IEEE article, particularly in FIG. 3 thereof. For example, charges are accumulated alternately by electrodes number 1 and by numbers 2 + 3 jointly for even and odd fields, respectively, as described on page 537, lines 3–1 from the bottom of the left column of the above article.

The charges accumulated in the imaging area 11 are transferred in parallel to the storage area 12 (in FIG. 1, arrows represent the charge-transferring direction) during the vertical blanking period, and stored therein. The charges stored in the storage area 12 are parallel-transferred by one step for every two horizontal scanning periods. The charges stored in the lowermost charge-coupled array are transferred to the uppermost read-out register 14 of the read-out register area 13. The charge transfer in the storage area 12 and from area 12 to the read-out register area 13 is performed during the horizontal blanking period. The charges transferred from the storage area 12 to the read-out register area 13 are serially-transferred rightward in FIG. 1 for 1H, whereby the interlaced intermittent video signal A is obtained through a read-out means 14a at a terminal 17.

The signal passed through the read-out means 14a is applied to an input means 15a of the read-out registor 15, in which the charges corresponding to the signal A are serial-transferred leftward for 1H. Therefore, the 1H delayed video signal B which lags the video signal A by 1H is obtained through a read-out means 15b at a terminal 18. Further, the signal passed through the read-out means 15b is applied to an input means 16a of the read-out register 16, and the charges are serial-transferred rightward for 1H in the read-out register 16. Thus, the 2H delayed video signal is obtained through a read-out means 16b at a terminal 19. In the read-out register area 13, all of the registers 14, 15 and 16 are driven by the same clock pulse.

The video signals A, B and C generated by the video signal generator 10 are supplied to input terminals 21, 22 and 23 of the signal processor 20, respectively. The non-delay and 2H delay video signals A and C are supplied from the terminals 21 and 23 through attenuating resistors 21a and 23a to a mixer 24, respectively, to obtain a mixed video signal D shown in FIG. 2(4), in which $n-1$, $n$, $n+1$, - - - represent video signals in $(n-1)$th, $n$-th, $(n+1)$th horizontal scanning lines. The attenuating resistors are provided for controlling a mixing ratio in the mixer 24, and have an equal resistance in the first embodiment. The mixed video signal D is supplied to a switching circuit 25, which is also supplied with the 1H delayed video signal B through an attenuating resistor 22a. The resistance of the resistor 22a is determined so that the input video signals of the switching circuit 25 have an identical amplitude.

Figure 2:
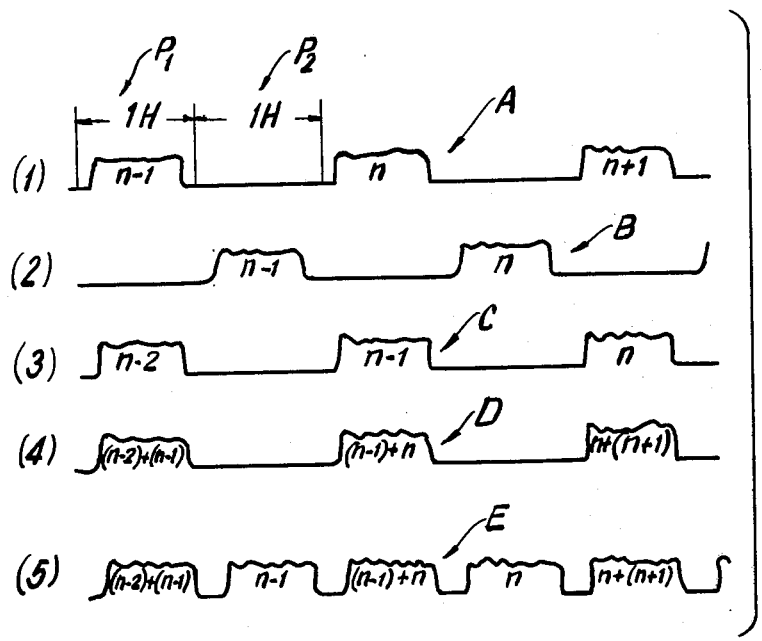
FIG. 2 is a waveform diagram of signals appearing at various circuit points in the first embodiment shown in FIG. 1.

The switching operation at the switching circuit 25 is performed only within the horizontal blanking period once for every horizontal scanning period, to obtain a continuous video signal E shown in FIG. 2(5). The continuous video signal E is supplied through a low pass filter 26 and a video amplifier 27 to an output terminal 28.

As clearly understood from FIG. 2, it is possible from the FIG. 1 arrangement to obtain a composite video signal E having a larger number of scanning lines employing an imaging device having an imaging area of smaller number of horizontal element arrays by using the line correlation technique. This means that a standard television signal for example, having, 525 scanning lines may be obtained from an imaging CCD having an imaging area of 128 × 256 elements. Further, because the video signal corresponding to the non-video signal portion of the intermittent video signal is made of the mixture of both of the adjacent video signals, i.e., because of the line correlation technique, the natural-like appearance of the contour on the displayed picture is significantly improved.

Figure 3:
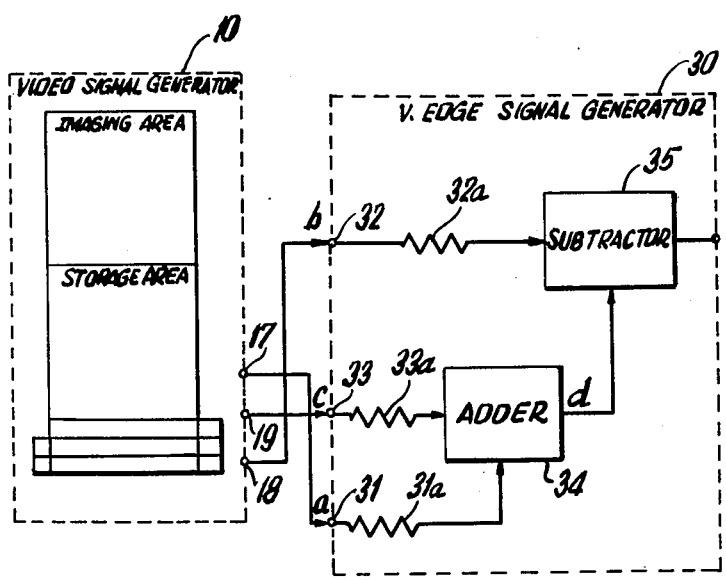
FIG. 3 is a block diagram of a second embodiment of this invention.
Figure 4:
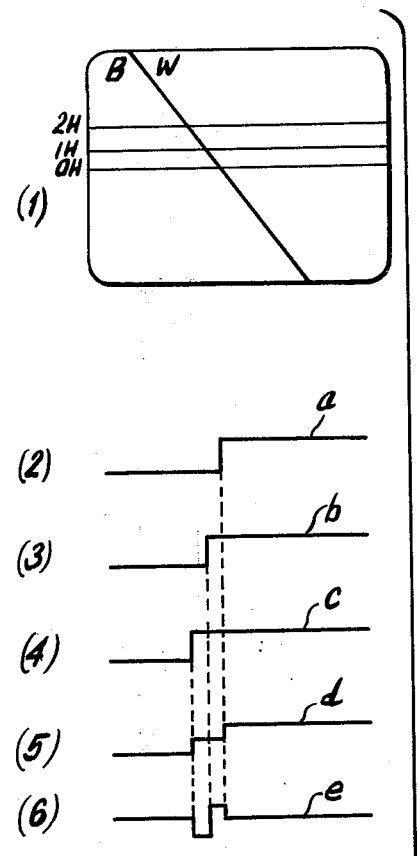
FIG. 4 is a waveform diagram of signals appearing at various circuit points of the second embodiment shown in FIG. 3.

Referring to FIG. 3, there is shown a second embodiment of the present invention comprising the video signal generator 10 according to this invention, and a vertical edge signal generator 30 for generating a vertical edge signal. When an optical image having a contour as shown in FIG. 4(1) is applied to the imaging area of the video signal generator 10, video signals $a$, $b$ and $c$ shown in FIGS. 4(2), 4(3) and 4(4) are obtained at the terminals 17, 18 and 19, respectively. The video signals $a$, $b$ and $c$ are supplied to input terminals 31, 32 and 33 of the vertical edge signal generator 30, respectively.

The non-delay and 2H delayed video signals $a$ and $c$ are supplied through resistors 31a and 33a to an adder 34 to obtain an added signal $d$ shown in FIG. 4(5). The signal $d$ is supplied to a subtractor 35 to which the 1H delayed video signal $b$ is also supplied through a resistor 32a and in which a subtraction in amplitudes of the signals $b$ and $d$ is achieved to obtain a vertical edge signal $e$ shown in FIG. 4(6) for contour compensation.

Figure 5:
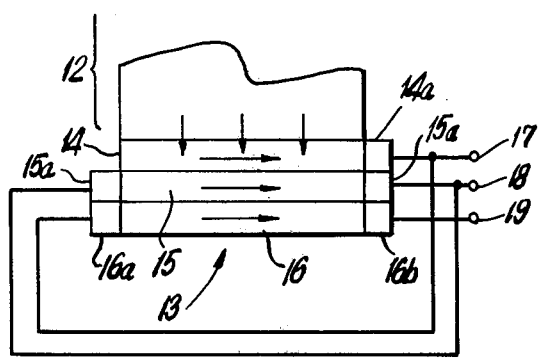
FIGS. 5, 6 and 7 show modifications of the imaging device shown in FIG. 1.
Figure 6:
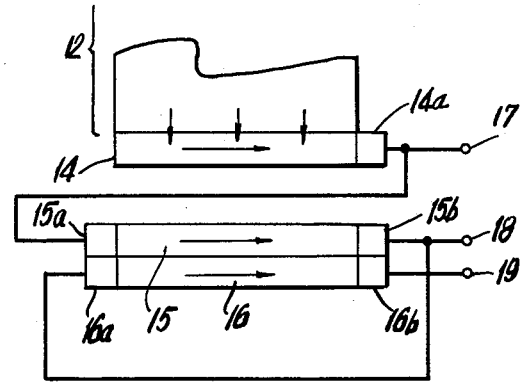
Figure 7:
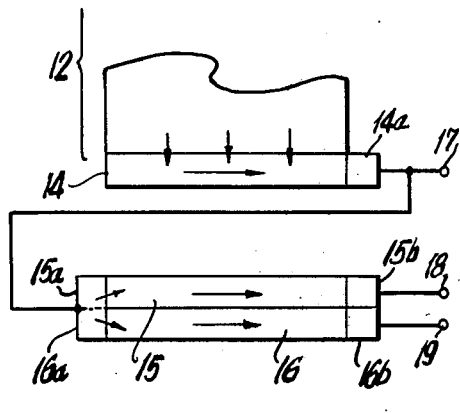

Referring to FIGS. 5, 6 and 7, there are shown modifications of the video signal generator 10 shown in FIG. 1, in which only the read-out register area 13 is shown. In the modification shown in FIG. 5, the charge transferring directions in the read-out registers 14, 15 and 16 are identical to each other, i.e., rightward. This simplifies mask design and a driving circuit for the read-out register area.

In the second modification shown in FIG. 6, the read-out registers 15 and 16 are formed on a different chip from a main chip on which the read-out register 14 is formed, while the CCD's shown in FIGS. 1 and 5 are formed on a single chip.

Figure 8:
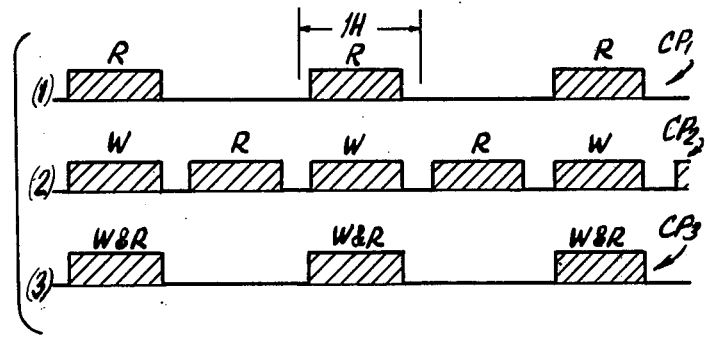
FIG. 8 shows driving clock pulses for the modification shown in FIG. 7.

In the third modification shown in FIG. 7, the output of the read-out register 14 is applied to the input means 15a and 16a of the read-out registers 15 and 16, to which the driving clock pulses $CP_2$ and $CP_3$ shown in FIGS. 8(2) and 8(3) are applied, respectively. A driving clock pulse $CP_1$ shown in FIG. 8(1) is applied to the read-out register 14. In FIG. 8, "R", "W" and "W & R" respectively represent read-out only, write-in only, and both read and write.

In the first horizontal scanning period, the signal is read out from the register 14 and is simultaneously written in the registers 15 and 16. In the second period, only the signal stored in the register 15 is read out, while the signal written in the register 16 in the first period is held. In the third period, the signal written in the register 16 in the first period is read out, while the signal is read out from the register 14 and is written in the registers 15 and 16. Thus, the non-delay, 1H delayed and 2H delay video signals A, B and C are obtained at the terminals 17, 18 and 19, respectively.

Figure 9:
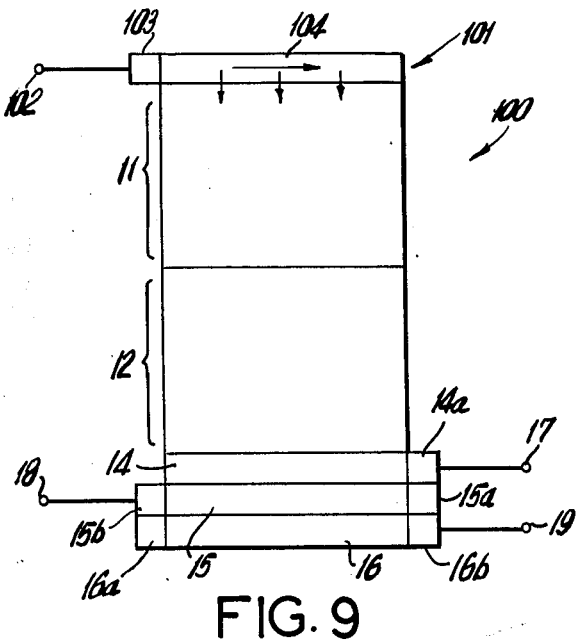
FIG. 9 is a schematic diagram of a third embodiment of this invention.

Referring to FIG. 9, a field memory 100 of a third embodiment comprises an input register area 101 including an input terminal 102, an input means 103 and an input register 104, a first area 11, a second area 12, and a read-out register area 13. The field memory 100 has an identical construction to the video signal generator 10 except for the input register area 101. A standard television signal is supplied through the input terminal 102 and the input means 103 to the input register 104, in which the charges corresponding to the input signal are serial-transferred in response to a first clock pulse produced from a standard synchronizing signal. When the charges for 1H have been written in the input register 104, the charges are parallel-transferred to the first area 11. The charge-transferring in the read-out registers 14, 15 and 16 is driven by a second clock pulse having a frequency twice that of the first clock pulse. It is therefore possible to obtain a television video signal having a same field frequency and scanning lines doubled compared to the standard television video signal by applying the output signals from the terminals 17 18 and 19 to the signal processor 20 shown in FIG. 1.

In the above embodiments. three read-out registers for producing the non-delay, 1H delay and 2H delayed video signals are provided. However, it is possible to provide more registers. For example, in the case of four registers, charge transfer from the storage area 12 to register area 13 is performed once every 3H, whereby the video signals having a signal portion for 1H and non-video signal portion for 2H are obtained. The non-delayed, 1H delayed, 2H delayed and 3H delayed video signals are mixed or switched to each other, whereby a video signal having scanning lines three times as large as the original ones is obtained.

The above described arrangement is merely illustrative of the principles of the present invention. Numerous modifications and adaptations thereof will be readily apparent to those skilled in the art without departing from the spirit and scope of the present invention.

What is claimed is:

1. In combination, two dimentional charge-coupled device means including means for supplying a first electrical wave comprising video signal portions of substantially a predetermined period, said wave portions being spaced by substantially said predetermined period, delaying means for supplying at least one replica of said first electrical wave each delayed by a different integral multiple of said predetermined period, and means for algebraically summing said first electrical waves and said delayed replicas thereof, wherein said summing means includes switching means operable at a rate given by said predetermined period for converging said video signals supplied by said charge-coupled device means.

* * * * *